(12) United States Patent
Pourcheresse

(10) Patent No.: US 12,370,868 B2
(45) Date of Patent: Jul. 29, 2025

(54) ENERGY CONTROL SYSTEM FOR AN ELECTRIC VEHICLE

(71) Applicant: Carrier Corporation, Palm Beach Gardens, FL (US)

(72) Inventor: Lionel Pourcheresse, Franqueville Saint Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 231 days.

(21) Appl. No.: 18/071,152

(22) Filed: Nov. 29, 2022

(65) Prior Publication Data
US 2023/0166581 A1 Jun. 1, 2023

(30) Foreign Application Priority Data
Dec. 1, 2021 (EP) ..................................... 21211814

(51) Int. Cl.
*B60H 1/32* (2006.01)
*B60H 1/00* (2006.01)
*B60L 58/12* (2019.01)

(52) U.S. Cl.
CPC ....... *B60H 1/3232* (2013.01); *B60H 1/00392* (2013.01); *B60H 1/00428* (2013.01); *B60H 1/00985* (2013.01); *B60L 58/12* (2019.02); *B60L 2240/34* (2013.01)

(58) Field of Classification Search
CPC .............. B60H 1/3232; B60H 1/00392; B60H 1/00428; B60H 1/00985; B60L 58/12; B60L 2240/34; B60L 2200/36; B60L 2260/52; B60L 2260/54; B60L 2250/16
See application file for complete search history.

(56) References Cited

U.S. PATENT DOCUMENTS

| | | | |
|---|---|---|---|
| 3,973,618 | A | 8/1976 | Naley et al. |
| 4,667,480 | A | 5/1987 | Bessler |
| 5,253,700 | A | 10/1993 | Early, Jr. |
| 6,089,034 | A | 7/2000 | Lake |

(Continued)

FOREIGN PATENT DOCUMENTS

| | | |
|---|---|---|
| CN | 113335083 A | 9/2021 |
| DE | 102014200450 A1 | 7/2015 |

(Continued)

OTHER PUBLICATIONS

European Search Report for Application No. 21211814.5; Issued Jun. 7, 2022; 9 Pages.

*Primary Examiner* — Marc E Norman
(74) *Attorney, Agent, or Firm* — CANTOR COLBURN LLP

(57) ABSTRACT

An energy control system for use with an electric vehicle having an energy storage device that powers both the propulsion system of the vehicle and a transport refrigeration unit that is configured to condition a cargo space of the vehicle; the energy control system is configured to receive a user selection relating to energy to be allocated to the propulsion system and/or the transport refrigeration unit; and the energy control system is configured to provide control for an energy allocation of the available energy in the energy storage device between the propulsion system and the transport refrigeration unit based on the user selection and the available energy in the energy storage device.

20 Claims, 3 Drawing Sheets

(56) References Cited

U.S. PATENT DOCUMENTS

| | | | |
|---|---|---|---|
| 8,594,918 | B2 | 11/2013 | Meyer-Ebeling et al. |
| 10,295,355 | B2 | 5/2019 | Baglino et al. |
| 10,551,205 | B2 | 2/2020 | Gaspard-Boulinc et al. |
| 10,933,825 | B2 | 3/2021 | Schumacher et al. |
| 2012/0109413 | A1 | 5/2012 | Smith et al. |
| 2016/0200212 | A1* | 7/2016 | Six .................... B60L 15/2045 318/139 |
| 2018/0257666 | A1* | 9/2018 | Bryan ....................... B60L 1/02 |
| 2019/0263218 | A1 | 8/2019 | Gough et al. |
| 2019/0283541 | A1 | 9/2019 | Adetola et al. |
| 2021/0070134 | A1* | 3/2021 | Schumacher ............. H02J 3/32 |
| 2021/0070141 | A1* | 3/2021 | Schumacher ........... H02J 1/106 |
| 2024/0075848 | A1* | 3/2024 | Charoulet ............ B60H 1/3211 |

FOREIGN PATENT DOCUMENTS

| | | |
|---|---|---|
| DE | 102017209133 A1 | 12/2018 |
| DE | 102017218965 A1 | 4/2019 |
| EP | 2232158 A2 | 9/2010 |
| EP | 2603752 A2 | 6/2013 |
| EP | 3104122 A1 | 12/2016 |
| EP | 3677459 A1 | 7/2020 |
| EP | 3820018 A1 | 5/2021 |

\* cited by examiner

ENERGY CONTROL SYSTEM FOR AN ELECTRIC VEHICLE

FOREIGN PRIORITY

This application claims priority to European Patent Application No. 21211814.5, filed Dec. 1, 2021, and all the benefits accruing therefrom under 35 U.S.C. § 119, the contents of which in its entirety are herein incorporated by reference.

TECHNICAL FIELD OF INVENTION

The present invention relates to an energy control system and method that provides control for an energy allocation between a propulsion system and transport refrigeration unit of an electric vehicle.

BACKGROUND OF THE INVENTION

Conventional light commercial vehicles (LCVs) are powered by an internal combustion engine (ICE) and in particular a diesel ICE. LCVs with a transport refrigeration unit (TRU), i.e. a unit that conditions, e.g. cools or heats, a cargo space, typically have a drive belt installed between the ICE and the TRU such that the ICE drives a compressor of the TRU to condition the air of the cargo space. LCVs in this configuration require the engine to be switched on for the TRU to be powered.

Conventional heavy goods vehicles (HGVs) are also powered by an ICE and in particular a diesel ICE. HGVs with a TRU or a trailer that has a TRU typically have a separate diesel ICE to power the TRU. In this case operation of the TRU is not dependent on the ICE that powers the HGV being in operation.

Currently vehicle manufacturers are moving away from using ICEs to power vehicles and instead are implementing electrified systems. These electrified vehicles typically comprise an energy storage device, e.g. rechargeable battery packs, fuel cells and the like to store energy and power electric motors to propel the vehicle. In the case of LCVs and HGVs it is desirable for the same energy storage device that powers the electric motors to power the TRU.

SUMMARY OF THE INVENTION

According to a first aspect, there is provided an energy control system for use with an electric vehicle having an energy storage device that powers both a propulsion system of the vehicle and a transport refrigeration unit (TRU) that is configured to condition a cargo space of the vehicle; wherein the energy control system is configured to receive a user selection relating to energy to be allocated to the propulsion system and/or the transport refrigeration unit; and wherein the energy control system is configured to provide control for an energy allocation of the available energy in the energy storage device between the propulsion system and the transport refrigeration unit based on the user selection and the available energy in the energy storage device.

Advantageously, the energy control system provides a means of effectively utilising the energy storage device of the electric vehicle for both the propulsion system and the transport refrigeration unit of the vehicle. In other words, the transport refrigeration unit does not require a separate additional energy source from the vehicle's primary power source. This reduces the cost of the vehicle as fewer energy sources and systems are required as well as reducing the maintenance burden of the vehicle.

Further, the energy control system provides a technical means for a user, e.g. a driver, to understand and manage the energy available in the energy storage device of the vehicle. By way of example, a delivery driver utilising an electric vehicle having the energy control system of the invention may know that they will be making numerous stops to deliver products within a town or city and that they may not be driving significant distances but may take an extended period of time due to making numerous stops. In this example, the driver could use the energy control system to manage the available energy in a manner to favour the transport refrigeration unit to ensure that it can run for the duration of their shift or the expected time to deliver the products requiring conditioning. Thus, the energy control system advantageously provides the user with choice of how the vehicle is operated thereby making most effective use of available energy.

Conditioning of the cargo space refers to controlling the atmosphere within the cargo space. For example, the transport refrigeration unit may be configured to cool the cargo space or heat the cargo space dependent on the current cargo space temperature, cargo temperature, external temperature and desired cargo space temperature. The transport refrigeration unit may also be configured to increase or decrease the humidity of the cargo space.

As mentioned above, the energy control system is configured to provide control for an energy allocation of the available energy in the energy storage device between the propulsion system and the transport refrigeration unit based on the user selection and the available energy in the energy storage device. The control may be provided in various different ways. For example, the energy control system may provide a control signal for directly or indirectly controlling the energy allocated to the TRU and propulsion system. This control signal may be an electrical signal, such as a digital or analogue signal. The control signal may control the energy supplied by the energy storage device to each of the TRU and propulsion system, e.g. it may control the energy storage device itself. The control signal may control the TRU and propulsion system to control the energy sought/accepted/received by the TRU and propulsion system. The control signal may control a device that in turn controls the energy supplied to the TRU and propulsion system.

Alternatively, the energy control system may be configured to directly control the energy allocation, e.g. it may be configured to receive energy from the energy storage device, and to distribute the appropriate allocation to each of the propulsion system and the TRU.

The user selection may comprise a selected energy allocation between the propulsion system and the transport refrigeration unit. The energy control system may be configured to determine an achievable range of the vehicle and an achievable conditioning time of the cargo space of the vehicle based on the selected energy allocation and the available energy in the energy storage device. The energy control system may comprise a display to display the achievable range and the achievable conditioning time to the user. By displaying these values, visibility is provided to the user enabling them to adaptively control the energy allocation, e.g. by making a new user selection.

In other words, the energy control system may be configured to allow a user to select the proportion of the available energy in the energy storage device that is to be provided to each of the propulsion system and the transport refrigeration unit. For example, if the user selects x% of available energy to be allocated to the propulsion system, then the remaining y % of available energy will be allocated to the transport refrigeration unit, e.g. y %=available energy %−x%, and vice versa.

Optionally, a portion of the total energy available from the energy storage device may be allocated to the operation of systems other than the propulsion system and the transport refrigeration unit and hence the available energy in the energy storage device to be allocated between the propulsion system and transport refrigeration unit may be less than the total energy stored in the energy storage device. Hence, the term "available energy" is used to describe the amount of energy actually available for allocation to the TRU and propulsion system.

References to an achievable range of the vehicle will be understood by those skilled in the art to refer to the distance the vehicle can travel. References to an achievable conditioning time of the cargo space of the vehicle will be understood by those skilled in the art to refer to the time that that the TRU can operate for, e.g. hours, minutes, seconds etc.

The user selection relating to energy to be allocated to the propulsion system and/or the transport refrigeration unit may comprise a desired range of the vehicle. In this case, the user selection relates to energy to be allocated to the propulsion system. It will be appreciated that the desired range of the vehicle has a direct relationship with the energy that would need to be allocated to the propulsion system in order to achieve that range, therefore it can be understood that the user selection of a range relates to the energy to be allocated to the propulsion system.

The energy control system may be configured to provide control to allocate energy to the propulsion system to achieve the desired range. The energy control system may therefore be configured to determine the energy required to achieve the desired range. For example, the energy required may be determined by:

$$E = R \times C$$

Where E=energy required (in kWh)
R=desired range (in km)
C=estimated energy consumption of the propulsion system per km (in kWh/km)

The energy control system may be configured to determine the remaining energy, for example by subtracting the energy required to achieve the desired range from the available energy in the energy storage device, and to allocate the remaining energy from the available energy to the transport refrigeration unit. Therefore the energy control system provides control for the energy allocation between the propulsion system and the transport refrigeration unit based on the desired range selected by the user.

The energy control system may be configured to determine an achievable conditioning time of the cargo space of the vehicle based on the remaining energy. A suitable method of determining an achievable conditioning time from an energy quantity (e.g. the remaining energy) is described later. The energy control system may comprise a display to display the desired range selected by the user and/or achievable conditioning time to the user. By displaying these values, visibility is provided to the user enabling them to adaptively control the energy allocation, e.g. by making a new user selection.

Therefore, for example, a user may select a desired range of 100 km, and the energy control system may provide control to allocate the energy required to achieve a range of 100 km. This desired range of 100 km may be displayed. The remaining energy may be allocated to the transport refrigeration unit. The energy control system may determine the achievable conditioning time based on the remaining energy, for example, the remaining energy may be enough to achieve a conditioning time of 2 hours. The system may display this achievable conditioning time of 2 hours to the user.

It is possible that the user may desire a vehicle range which is not achievable given the available energy in the energy storage device. The energy control system may address this problem in different ways. For example, the energy control system may pre-determine (i.e. prior to receiving a user input) the maximum possible range (if all energy were allocated to the range). The system may then only allow a user to select a range within that maximum possible range. In other words, the system may prevent a user from selecting a range greater than the maximum possible range. The skilled person would appreciate that there are numerous possible ways that such functionality may be provided, for example a dial could be presented to the user displaying a range between zero and the maximum possible, such that the user is able to turn the dial to select any range up to the maximum range. For example, the energy control system may pre-determine a maximum range of 250 km. The system may therefore be configured to only allow user input of a desired range up to 250 km.

Another way of addressing the issue that the user may desire a vehicle range which is not achievable given the available energy in the energy storage device may be to configure the energy control system such that, after a user has input a desired range, the system determines whether that range is achievable based on the available energy. If the range is achievable, then the system proceeds as previously described, i.e. to provide control to allocate energy to the propulsion system to achieve the desired range. However if the range is unachievable, the system may be configured to alert the user, e.g. by displaying a warning and/or making a sound. The system may then await a user input of a lower range, optionally after prompting the user to input a lower range. The system may be configured to determine the maximum range achievable with the available energy, and display that maximum range to the user. For example, the user may input a desired range of 300 km. The system may determine that this is unachievable and that a maximum range of 250 km can be achieved with the available energy. The system may alert the user of this and display the maximum range of 250 km, such that the user can select a new achievable desired range.

The user selection relating to energy to be allocated to the propulsion system and/or the transport refrigeration unit may comprise a desired conditioning time of the cargo space of the vehicle. In this case, the user selection relates to energy to be allocated to the transport refrigeration unit. It will be appreciated that the desired conditioning time of the cargo space of the vehicle has a direct relationship with the energy that would need to be allocated to the transport refrigeration unit in order to achieve that conditioning time, therefore it can be understood that the user selection of a conditioning time relates to the energy to be allocated to the transport refrigeration unit.

The energy control system may be configured to provide control to allocate energy to the transport refrigeration unit to achieve the desired conditioning time. The energy control system may therefore be configured to determine the energy required to achieve the desired conditioning time. For example, the energy required may be determined by:

$$E = T \times C$$

Where E=energy required (in kWh)
T=desired conditioning time (in hours)
C=estimated power draw of the TRU (in kW)

The energy control system may be configured to determine the remaining energy, for example by subtracting the energy required to achieve the desired conditioning time from the available energy in the energy storage device, and to allocate the remaining energy from the available energy to the propulsion system. Therefore the energy control system provides control for the energy allocation between the propulsion system and the transport refrigeration unit based on the desired conditioning time selected by the user.

The energy control system may be configured to determine an achievable range of the vehicle based on the remaining energy. A suitable method of determining an achievable range from an energy quantity (e.g. the remaining energy) is described later. The energy control system may comprise a display to display the desired conditioning time and/or achievable range to the user. By displaying these values, visibility is provided to the user enabling them to adaptively control the energy allocation, e.g. by making a new user selection.

Therefore, for example, the user may select a desired conditioning time of 2 hours, and the energy control system may provide control to allocate the energy required to achieve a conditioning time of 2 hours. The remaining energy may be allocated to the propulsion system. The energy control system may determine the achievable range based on the remaining energy, for example, the remaining energy may be enough to achieve a range of 200 km. The system may display this achievable range of 200 km to the user.

It is possible that the user may desire a conditioning time which is not achievable given the available energy in the energy storage device. The energy control system may address this problem in different ways. For example, the energy control system may pre-determine (i.e. prior to receiving a user input) the maximum possible conditioning time (if all energy were allocated to the conditioning time). The system may then only allow a user to select a conditioning time within that maximum possible range. In other words, the system may prevent a user from selecting a conditioning time greater than the maximum possible conditioning time. The skilled person would appreciate that there are numerous possible ways that such functionality may be provided, for example a dial could be presented to the user displaying a range between zero and the maximum possible, such that the user is able to turn the dial to select any range up to the maximum conditioning time. For example, the energy control system may pre-determine a maximum conditioning time of 3 hours. The system may therefore be configured to only allow user input of a desired range up to 3 hours.

Another way of addressing the issue that the user may desire a conditioning time which is not achievable given the available energy in the energy storage device may be to configure the energy control system such that, after a user has input a desired conditioning time, the system determines whether that conditioning time is achievable based on the available energy. If the conditioning time is achievable, then the system proceeds as previously described, i.e. to provide control to allocate energy to the TRU to achieve the desired conditioning time. However if the conditioning time is unachievable, the system may be configured to alert the user, e.g. by displaying a warning and/or making a sound. The system may then await a user input of a lower conditioning time, optionally after prompting the user to input a lower conditioning time. The system may be configured to determine the maximum conditioning time achievable with the available energy, and display that maximum conditioning time to the user. For example, the user may input a desired conditioning time of 4 hours. The system may determine that this is unachievable and that a maximum conditioning time of 3 hours can be achieved with the available energy. The system may alert the user of this and display the maximum conditioning time of 3 hours, such that the user can select a new achievable desired conditioning time.

It will be appreciated from the above discussion that where the user selection relating to energy to be allocated is of a desired range of the vehicle or the conditioning time the user is indirectly selecting an energy allocation.

A user selection may also be considered a user input. A user selection may also be considered a user input of a value.

As described above, the user selection that the energy control system is configured to receive may be a selected energy allocation between the propulsion system and the TRU. The user selection may also be a desired range or a desired conditioning time.

It will be appreciated that the energy control system may in fact be configured to receive more than one user selection. The energy control system would then be configured, for each of the user selections, to provide control for an energy allocation based on that user selection.

In other words, the energy control system may in fact be configured to receive any of a selected energy allocation between the propulsion system and the TRU, a desired range, and a desired conditioning time. The energy control system would then be configured, for each of the inputs it is configured to receive, to provide control for an energy allocation based on that input.

Therefore, the energy control system may be configured to receive a selected energy allocation and one or both of a desired range and a desired conditioning time. The control system would then be configured to provide control for an energy allocation based on a received selected energy allocation, and one or both of: being configured to provide control for an energy allocation based on a received desired range, being configured to provide control for an energy allocation based on a received desired conditioning time (as appropriate).

The energy control system may be configured to receive a desired range and it may be configured to receive a desired conditioning time. The control system would then be configured to provide control for an energy allocation based on a received desired range. It would also be configured to provide control for an energy allocation based on a received conditioning time.

Put another way, the user selection of the first aspect set out above may comprise a selected energy allocation between the propulsion system and the transport refrigeration unit such that the energy control system is configured to provide control for an energy allocation based on the selected energy allocation. The energy control system may also be configured to receive a user selection of a desired range and to provide control for an energy allocation of the available energy in the energy storage device between the propulsion system and the transport refrigeration unit based on a received desired range and the available energy in the energy storage device. The energy control system may also be configured to receive a user selection of a desired conditioning time of the cargo space of the vehicle and to provide control for an energy allocation of the available energy in the energy storage device between the propulsion system and the transport refrigeration unit based on a received desired conditioning time and the available energy in the energy storage device.

The user selection of the first aspect set out above may comprise a desired range of the vehicle such that the energy control system is configured to provide control for an energy allocation based on a received desired range. The energy control system may also be configured to receive a user selection of a desired conditioning time of the cargo space of the vehicle and wherein the energy control system is configured to provide control for an energy allocation of the available energy in the energy storage device between the propulsion system and the transport refrigeration unit based on a received desired conditioning time and the available energy in the energy storage device.

The features described previously in relation to the different user selections (selected energy allocation, desired range, desired conditioning time) apply equally to the scenarios just described in which the energy control system is configured to receive multiple user selections.

The energy storage device may be a battery or battery pack. The energy storage device may be a fuel cell.

As discussed above, the energy control system is configured to receive a user selection relating to energy to be allocated to the propulsion system and/or the TRU. Therefore it can be considered that the energy control system has functionality configured to receive a user selection relating to energy to be allocated to the propulsion system and/or the TRU. Similarly, the energy control system is configured to provide control for an energy allocation of the available energy. Therefore it can be considered that the energy control system has functionality configured to provide that control. The functionality may be implemented by a processor as discussed below.

The energy control system may typically comprise one or more processor(s) configured to carry out the described functionality. A processor may be configured to receive the user selection relating to energy to be allocated to the propulsion system and/or the transport refrigeration unit. The processor, or a different processor may be configured to provide control for an energy allocation of the available energy in the energy storage device between the propulsion system and the TRU based on the user selection and the energy available in the energy storage device.

The one or more processor(s) may also be configured to provide any of the various further functions or features of the energy control system described above and below. For example, one processor may be configured to carry out one function, and another to carry out another. Or, one processor may carry out various functions.

The energy control system may comprise a detection device for detecting the available energy in the energy storage device. The energy control system may be configured to receive an input indicating the available energy in the energy storage device.

The energy control system may comprise a user interface configured to allow a user to input the user selection.

The user interface may comprise a voice bot. The user interface may comprise at least one of a slider, a button and a dial. These may be mechanical devices, for example a mechanical slider, mechanical button and mechanical dial. Mechanical device(s) may be accompanied by electronic display elements, e.g. an electronic display may be provided with a mechanical slider, to display e.g. a particular number. For example, a mechanical slider may be provided for a user to input a desired range. An electronic display may be provided to indicate the range the slider position corresponds to.

The user interface may be a graphical user interface, in other words the user interface may be implemented digitally. The graphical user interface may for example comprise a touch screen. Various input options may be utilised with the graphical user interface, for example the graphical user interface may comprise at least one of a graphically implemented slider, button, dial and a text input field.

For example, a graphically implemented slider may allow the user to set the energy allocation between the propulsion system and the transport refrigeration unit.

As discussed above, a display may be provided to display the achievable range and/or achievable conditioning time to the user. This may be incorporated with a graphical user interface. In other words, a display screen, such as a touch screen, may provide both display and user interface functionality.

In the case in which the energy control system is configured to receive more than one user selection (e.g. selected energy allocation and/or desired range and/or desired conditioning time), separate user interfaces may be provided to receive each type of user selection. Alternatively, a single user interface may be provided to receive all types of user selection. For example, a single graphical user interface, e.g. a touch screen, may be provided with an input option (such as a slider, button etc) for one or more of selected energy allocation, desired range and desired conditioning time. Such a graphical user interface may also display an achievable range and/or achievable conditioning time according to a received user input.

The energy control system may repeatedly re-determine and optionally display an achievable range of the vehicle and/or an achievable conditioning time of the cargo space of the vehicle according to the remaining energy in the respective energy allocation whilst a vehicle having the energy control system is in use.

The display may be configured to display the current achievable range and/or achievable conditioning time to the user in real time. Thus, the user can monitor the use of the energy and make adjustments to the user selection if necessary. Consequently, adaptive control is advantageously provided.

The energy control system may be configured to receive a user selection of a target temperature of the cargo space and the energy control system may be configured to provide control for the energy allocation also based on the target temperature. Clearly, the temperature required may affect the power draw of the TRU and therefore the conditioning time achievable. The energy control system may determine the conditioning time achievable also based on the target temperature. This may be achieved by altering the power draw of the TRU according to the target temperature in the equation below for achievable conditioning time.

Therefore the user can manipulate the target temperature in order to control the amount of energy required by the TRU. Further, the target temperature of the cargo space may be adjusted dependent on the type of cargo being transported, for example chilled or frozen goods, hence the energy control system advantageously provides the user with a means of understanding an adjusting the conditioning time achievable based on the temperature necessary for the current goods being transported.

The energy control system may be configured to receive an indication of energy required to achieve a target temperature and the energy control system may be configured to provide the control for the energy allocation also based on the energy required for the target temperature.

The energy control system may provide control for the energy allocation based on an estimated energy consumption/power draw of the propulsion system and/or TRU. In other words, the energy control system may provide control for the energy allocation based on an estimated energy consumption, e.g. energy per unit distance, and/or estimated power draw, i.e. energy per unit time, of the propulsion system and/or TRU.

The energy control system may determine the achievable range of the vehicle and/or the achievable conditioning time based on an estimated energy consumption/power draw of the propulsion system and/or the transport refrigeration unit respectively as a function of the available energy in the energy storage device and the user selection relating to energy to be allocated to the propulsion system and/or the transport refrigeration unit. The achievable range may be determined based on an estimated energy consumption of the propulsion system (e.g. energy per unit distance) as a function of the available energy in the energy storage device and the user selection. The achievable conditioning time may be determined based on an estimated power draw of the TRU (e.g. energy per unit time) as a function of the available energy in the energy storage device and the user selection.

For example, where the user selection is an energy allocation, the energy control system may determine the achievable range and time based on an estimated energy consumption of the propulsion system/power draw of the TRU and the proportion of the energy the user has chosen to allocate to each system. Where the user selection is a range, the energy control system may determine if the range is achievable based on the available energy in the energy storage device and may determine a conditioning time based on the remaining energy in the energy storage device. Where the user selection is a conditioning time, the energy control system may determine if the conditioning time is achievable based on the available energy in the energy storage device and may determine a range based on the remaining energy in the energy storage device.

The skilled person will appreciate that achievable range means a range that it is estimated can be achieved with a particular amount of energy, and not necessarily the range that will definitely be achieved as this will vary based on various factors. Similarly, the achievable conditioning time means a conditioning time that it is estimated can be achieved with a particular amount of energy, and not necessarily the range that will definitely be achieved as this will vary based on various factors.

The skilled person would appreciate that the power draw of the transport refrigeration unit can be estimated by any well-known method. For example, the power draw of the TRU may typically be dependent on temperature. The skilled person would appreciate that power draw can be estimated based on temperature according to any well-known method.

The skilled person would also well appreciate that the conditioning time achievable may be determined based on estimated power draw, available energy and energy allocation, according to any well-known method.

For example if the available energy is x kWh, the energy allocation to the transport refrigeration unit is proportion y (representing the percentage of available energy allocated to the transport refrigeration unit), and the power draw of the transport refrigeration unit is z kW, then:

$$T=(x \times y)/z$$

where T is the achievable conditioning time based on the energy available, the energy allocation and the power draw of the transport refrigeration unit.

As a specific example, assuming an energy storage device having 100 kWh of available energy, an energy allocation of 10% to the transport refrigeration unit and the transport refrigeration unit consuming 2 kW, then:

$$T=(100\ kWh \times 0.1)/2\ kW = 5\ \text{hours}$$

Furthermore, achievable conditioning time T can be determined based on an energy quantity E in kWh and power draw z of the TRU in kW according to:

$$T=E/z$$

The skilled person would appreciate that the energy consumption of the propulsion system can be estimated by any well-known method. The estimation may for example be based on an average speed; route profile such as uphill or downhill; driving style such as aggressive or conservative, i.e. high or low acceleration; vehicle load, etc. The skilled person would also well appreciate that the achievable range of the vehicle may be determined based on estimated energy consumption of the propulsion system, available energy and energy allocation, according to any well-known method.

For example if the available energy is x kWh, the energy allocation to the propulsion system is proportion y (representing the percentage of available energy allocated to the propulsion system), and the energy consumption/draw of the propulsion system is z kWh per km, then:

$$R=(x \times y)/z$$

where R is the achievable range of the vehicle based on the energy available, the energy allocation and the energy consumption of the propulsion system.

As a specific example, assuming an energy storage device having 100 kWh of available energy, an energy allocation of 90% to the propulsion system and the propulsion system consuming 0.3 kWh per km, then:

$$R=(100\ kWh \times 0.9)/(0.3\ kWh/km) = 300\ km$$

Furthermore, achievable range R can be determined based on an energy quantity E in kWh and energy consumption z of the propulsion system in kWh per km according to:

$$R=E/z$$

The energy control system may be configured to receive information regarding power/energy draw from a vehicle with which it is used. For example, a vehicle may be able to indicate the energy consumption of the propulsion system, e.g. for different driving situations, and/or the power draw of the TRU.

The energy control system may be configured to maintain an energy allocation between the propulsion system and TRU according to an initial user selection, e.g. at the start of a journey. That is, if the user selection is a selected energy allocation, that energy allocation may be maintained during the journey. If the user selection is a desired range of the vehicle, the energy allocation made to achieve that desired range may be maintained during the journey. If the user selection is a desired conditioning time of the cargo space of the vehicle, the energy allocation made to achieve that desired conditioning time may be maintained during the journey. In other words, once a user selection is made, the energy allocation according to that user selection is maintained, unless the user makes a new selection.

The energy control system may be configured to re-determine the achievable range of the vehicle and/or the achievable conditioning time if the current and/or expected energy consumption of the propulsion system or power draw of the transport refrigeration unit changes.

During use of a vehicle, a user may lower the target temperature of the cargo space and the transport refrigeration unit may draw more power than originally anticipated as a result. In the case in which the user selection was an energy allocation between the propulsion system and the TRU, the energy control system may then re-determine the achievable conditioning time according to the selected allocation and the increased power draw. In this example the achievable vehicle range would remain the same because the energy allocated to the propulsion system has not changed and the energy consumption of the propulsion system has not changed, instead the achievable conditioning time would change. The user could then vary the energy allocation if desired.

Alternatively, the energy control system may be configured to provide ongoing control in real time for the energy allocation of the available energy. The system may initially provide control based on the user selection, but during use of the vehicle with which the system is employed, various factors may influence the use of energy by the propulsion system and TRU such that an initial energy allocation to achieve a desired range or desired conditioning time may no longer be appropriate.

The system may be configured to monitor the energy usage by the propulsion system and TRU and adjust the energy allocation based on the energy usage, for example the energy control system may be configured to receive data indicating current and/or expected energy consumption/power draw of the propulsion system and the transport refrigeration unit.

For example, if the vehicle is driven more quickly than anticipated, a greater energy consumption than predicted may be required resulting in energy being used more quickly than predicted. Equally, if an ambient temperature external to the vehicle increases, a greater power may be drawn by the TRU to maintain a particular internal temperature, resulting in energy being used more quickly than predicted.

The energy control system may adjust the energy allocation based on such factors.

The system may therefore be configured to monitor the energy usage by the propulsion system and TRU and adjust the energy allocation based on the energy usage. For example the energy control system may be configured to receive data indicating current and/or expected energy consumption/power draw of the propulsion system and the transport refrigeration unit and/or the amount of energy remaining in the initial energy allocation. The energy control system may then provide control to adjust the energy allocation based on any of these value(s) and/or the original user selection.

For example, in the case that the user selection is a desired range, during a journey the energy control system may be configured to adjust the energy allocation if necessary to achieve the desired range. E.g. if there is not enough remaining energy in the energy allocation to achieve the desired range, then more energy will be allocated as necessary. If there is more energy than needed to achieve the desired range, then the energy allocation to the propulsion system will be reduced.

Similarly, in the case that the user selection is a desired conditioning time, during a journey the energy control system may be configured to adjust the energy allocation if necessary to achieve the desired conditioning time. E.g. if there is not enough remaining energy in the energy allocation to achieve the desired conditioning time, then more energy will be allocated as necessary. If there is more energy than needed to achieve the desired conditioning time, then the energy allocation to the transport refrigeration unit will be reduced.

In the case that the user selection is a desired energy allocation, as discussed above, the energy control system may be configured to determine an achievable range and achievable conditioning time based on the energy allocation. During a journey, the energy control system may be configured to adjust the energy allocation to maintain, as closely as possible, the achievable range and achievable conditioning time initially determined. E.g. if there is not enough energy to achieve the initially determined conditioning time but there is more energy than required to achieve the initially determined range, the energy allocation may be adjusted to provide a greater allocation to the TRU and a lower allocation to the propulsion system.

The energy control system may be configured to receive data regarding the amount of energy used by the propulsion system and TRU during a journey. The energy control system may be configured to repeatedly re-determine an achievable range of the vehicle and/or an achievable conditioning time of the cargo space of the vehicle during a journey based on energy remaining in an energy allocation for each of the propulsion system and TRU respectively. In other words, the achievable range and/or achievable conditioning time are monitored in real-time. The display may be configured to display the current achievable range and/or achievable conditioning time to the user in real time. Thus, the user can monitor the use of the energy and make adjustments to the user selection if necessary. Consequently, adaptive control is advantageously provided. It can therefore clearly be understood that the energy control system may be configured to receive a user selection and provide control based on that user selection at any time. Typically a user selection may be made at the start of the journey, but equally a user selection can be made at any time during the journey The energy control system may be configured to determine an achievable range of the vehicle and/or the achievable conditioning time in various ways. For example it could be based on interpolation of a previous energy consumption/power draw of the propulsion system and transport refrigeration unit along with the current user selection relating to energy to be allocated to the propulsion system and/or the transport refrigeration unit. Machine learning/AI systems could also be used, which may for example utilise factors such as past driving style, time, day, traffic information etc.

The energy control system may be configured to monitor the energy used by the propulsion system and/or the TRU and provide a warning that the energy used by the propulsion system and/or the transport refrigeration unit is within a predetermined threshold of the allocated energy for the propulsion system or TRU respectively. In other words, the energy control system may provide a warning when the energy used by one of the propulsion system or transport refrigeration unit approaches the total energy allocated for that system.

The predetermined threshold may be a threshold set by the user. That is, the energy control system may be configured to allow the user to select a threshold for receiving warnings. The threshold may be a percentage of energy allocation remaining. The threshold may be in units of range (e.g. miles or kilometres) and/or conditioning time remaining (e.g. hours, minutes). The energy control system may be configured to allow the user to set the predetermined threshold for receiving warnings as x kilometres range remaining and y hours of conditioning time remaining. For example the user may select to receive warnings when the vehicle's range is determined to be within 50 km and/or within 2 hours remaining of conditioning time achievable.

The warning may be provided visually on a display or may be an audible warning.

The energy control system may be configured to prevent further energy from being supplied to the propulsion system or transport refrigeration unit if the allocated energy has been used up by the propulsion system or transport refrigeration unit respectively.

The energy control system may be configured to receive data from the energy storage device, propulsion system and/or transport refrigeration unit via a communication protocol. The communication protocol may be Fleet Management System standard (FMS), Controller Area Network (CAN) communication, SAE J 1708, or SAE J 1587 protocols. The data may include information regarding current power/energy draw. The data may include information regarding current available energy. The data may include information regarding the condition of the energy storage device, propulsion system or transport refrigeration unit. The data may include the amount of energy used by the propulsion system and TRU.

In a second aspect there is provided an energy control system for use with an electric vehicle having an energy storage device that powers both the propulsion system of the vehicle and a transport refrigeration unit that is configured to condition a cargo space of the vehicle; wherein the energy control system is configured to receive a user selection of an energy allocation between the propulsion system and the transport refrigeration unit; and wherein based on the selected energy allocation, the energy control system is configured to determine the vehicle's range and the conditioning time achievable according to the selected energy allocation and the energy available in the energy storage device.

In a third aspect there is provided an energy control system for use with an electric vehicle having an energy storage device that powers both the propulsion system of the vehicle and a transport refrigeration unit that is configured to condition a cargo space of the vehicle; wherein the energy control system is configured to receive a user selection of a selected energy allocation; and wherein the energy control system is configured to provide control for an energy allocation of the available energy in the energy storage device between the propulsion system and the transport refrigeration unit based on a received selected energy allocation and the energy available in the energy storage device.

In a fourth aspect there is provided an energy control system for use with an electric vehicle having an energy storage device that powers both the propulsion system of the vehicle and a transport refrigeration unit that is configured to condition a cargo space of the vehicle; wherein the energy control system is configured to receive a user selection of a desired range of the vehicle; and wherein the energy control system is configured to provide control for an energy allocation of the available energy in the energy storage device between the propulsion system and the transport refrigeration unit based on a received desired range of the vehicle and the energy available in the energy storage device.

In a fifth aspect there is provided an energy control system for use with an electric vehicle having an energy storage device that powers both the propulsion system of the vehicle and a transport refrigeration unit that is configured to condition a cargo space of the vehicle; wherein the energy control system is configured to receive a user selection of a desired conditioning time of the cargo space of the vehicle; and wherein the energy control system is configured to provide control for an energy allocation of the available energy in the energy storage device between the propulsion system and the transport refrigeration unit based on a received desired conditioning time and the energy available in the energy storage device.

In a sixth aspect there is provided an energy control system for use with an electric vehicle having an energy storage device that powers both a propulsion system of the vehicle and a transport refrigeration unit that is configured to condition a cargo space of the vehicle; wherein the energy control system is configured to receive a user selection of a selected energy allocation between the propulsion system and the transport refrigeration unit, and wherein the energy control system is configured to provide control for an energy allocation of the available energy in the energy storage device between the propulsion system and the transport refrigeration unit based on a received selected energy allocation and the available energy in the energy storage device; and/or wherein the energy control system is configured to receive a user selection of a desired range and wherein the energy control system is configured to provide control for an energy allocation of the available energy in the energy storage device between the propulsion system and the transport refrigeration unit based on a received desired range and the available energy in the energy storage device; and/or wherein the energy control system is configured to receive a user selection of a desired conditioning time of the cargo space of the vehicle and wherein the energy control system is configured to provide control for an energy allocation of the available energy in the energy storage device between the propulsion system and the transport refrigeration unit based on a received desired conditioning time and the available energy in the energy storage device.

The energy control system of any of the second to sixth aspects may comprise one or more features described above in relation to the energy control system of the first aspect.

According to a seventh aspect, an electric vehicle system is provided comprising: an energy control system according to any of the aspects described above and optionally having any combination of the additional features as described above; and an electric vehicle comprising: a transport refrigeration unit configured to condition a cargo space of the vehicle; a propulsion system configured to propel the vehicle; and an energy storage device configured to power both the transport refrigeration unit and the propulsion system.

The energy control system may be located within the vehicle or may be located remotely from the vehicle.

The electric vehicle may comprise the energy control system. For example, the energy control system may be located within the vehicle. It may be located on or within a dashboard of the vehicle.

The energy control system may be comprised in a separate device to the vehicle. For example, the energy control system may be implemented on a user device, such as a mobile phone, tablet, laptop and the like.

It will be appreciated that the energy control system may comprise multiple components located in the same or different places. For example, the energy control system may comprise a user interface configured to receive the user selection, and a processor configured to provide control. The user interface may be implemented on one device, e.g. a mobile phone, whilst the processor may be integrated in the vehicle. The processor may be a processor already provided in the vehicle, which is configured to provide the described functionality. In other words, an existing processor may be used in the energy control system. The energy control system may be implemented at least partially on remote servers or in the cloud.

The electric vehicle may be an electric light commercial vehicle, an electric heavy goods vehicle or an electric truck. For example, the electric vehicle may be a food delivery vehicle in which the cargo space carries refrigerated food. The propulsion system and TRU are typically part of the same vehicle.

The vehicle may be a battery electric vehicle (BEV). The energy storage device may be an electric vehicle battery (EVB), also known as a traction battery. The vehicle may be a fuel cell electric vehicle (FCEV). The energy storage device may be a fuel cell.

As discussed previously, the energy control system may comprise a display. The energy control system may comprise a user interface, e.g. a graphical user interface. The graphical user interface may incorporate the display. The graphical user interface may comprise a touch screen. The display and/or graphical user interface may also perform other functions in the electric vehicle. For example, an electric vehicle is often provided with a display/graphical user interface, typically a touch screen, to provide information to and receive input from a user. The energy control system may utilise such a display/graphical user interface ordinarily present in the electric vehicle, such that an additional display/graphical user interface is not required. The energy control system may typically comprise a processor configured to carry out at least the control function and optionally other described functions. The processor may be connected to the display/graphical user interface ordinarily present in the electric vehicle via CAN, OBD, FMS, RS232, or wireless connections for example.

The vehicle may comprise a communication bus configured to transfer data between components of the vehicle such as the energy storage device, propulsion system, transport refrigeration unit and the energy control system. The communication bus may use a communication protocol such as Fleet Management System standard (FMS), Controller Area Network (CAN) communication, SAE J 1708, or SAE J 1587 protocols. The data may include information regarding current energy consumption/power draw. The data may include information regarding current available energy. The data may include information regarding the condition of the energy storage device, propulsion system or transport refrigeration unit.

The propulsion system may comprise one or more electrical motors mechanically coupled to the wheels of the vehicle to provide motive force.

The transport refrigeration unit may comprise a compressor, heat rejection heat exchanger, expansion valve and heat absorption heat exchanger, fluidly communicating refrigerant therebetween to form a refrigeration cycle. The heat absorption heat exchanger may be configured to cool the cargo space.

The energy storage device may be configured to power all systems of the electric vehicle. In other words, the energy storage device may be configured to power the propulsion system, the TRU and all other systems of the electric vehicle, for example ancillary systems such as lights and driver aids etc. The energy storage device may be formed of a number of battery cells or fuel cells.

As mentioned above, the energy control system is configured to provide control for an energy allocation of the available energy in the energy storage device between the propulsion system and the transport refrigeration unit based on the user selection and the available energy in the energy storage device.

The control may be provided in various different ways. For example, the energy control system may provide a control signal directly or indirectly controlling the energy allocated to the transport refrigeration unit and propulsion system. This control signal may be an electrical signal, such as a digital or analogue signal. In other words, the energy control system may be in communication, such as in digital communication, either directly or indirectly, with the TRU and propulsion system. The control signal may control a device that then controls the energy supplied to the TRU and propulsion system. The control signal may control the TRU and propulsion system to control the energy sought/accepted/received by the TRU and propulsion system. The control signal may control the energy supplied by the energy storage device to each of the TRU and propulsion system, e.g. it may control the energy storage device itself Alternatively, the energy control system may be configured to directly control the energy allocation, e.g. it may be configured to receive energy from the energy storage device, and to distribute the appropriate allocation to each of the propulsion system and the TRU. In other words, the energy control system is electrically connected to the propulsion system and TRU so as to supply energy to those devices.

According to an eighth aspect, a method of controlling the energy allocated to a propulsion system and a transport refrigeration unit from an energy storage device of an electric vehicle, the energy storage device having available energy, is provided, comprising: receiving a user selection relating to energy to be allocated to the propulsion system and/or the transport refrigeration unit; and controlling an energy allocation of the available energy in the energy storage device between the propulsion system and the transport refrigeration unit based on the user selection and the available energy in the energy storage device.

The user selection may comprise a selected energy allocation between the propulsion system and the transport refrigeration unit. The method may comprise: determining, based on the selected energy allocation and the available energy in the energy storage device, the achievable range of the vehicle and the conditioning time achievable. Optionally, the method may comprise displaying the achievable range and the achievable conditioning time.

The user selection may comprise a desired range of the vehicle and the method may comprise allocating energy to the propulsion system to achieve the desired range and allocating the remaining energy from the available energy to the transport refrigeration unit. The method may include determining an achievable conditioning time of the cargo space of the vehicle based on the remaining energy. The method may comprise displaying the achievable conditioning time. The method may comprise displaying the desired range.

The user selection may comprise a desired conditioning time of the cargo space of the vehicle and the method may comprise allocating energy to the transport refrigeration unit to achieve the desired conditioning time and allocating the remaining energy from the available energy to the propulsion system. The method may include determining an achievable range of the vehicle based on the remaining energy. The achievable range may be displayed to the user. The method may comprise displaying the desired conditioning time.

Determining the achievable range of the vehicle and/or the achievable conditioning time may be based on an estimated energy consumption/power draw of the propulsion system and/or the transport refrigeration unit respectively as a function of the available energy in the energy storage device and the user selection.

The method may comprise preventing further energy from being supplied to the propulsion system or transport refrigeration unit if the allocated energy has been used up by the propulsion system or transport refrigeration unit respectively.

The method may comprise providing a warning that the energy used by the propulsion system or the transport refrigeration unit is within a predetermined threshold of the allocated energy for the propulsion system or transport refrigeration unit respectively. In other words, a warning may be provided when the energy used by one of the propulsion system or transport refrigeration unit approaches the total energy allocated for that system.

The warning may be provided visually on a display or may be an audible warning.

According to a ninth aspect, there is provided a method of controlling the energy allocated to a propulsion system and a transport refrigeration unit from an energy storage device of an electric vehicle, comprising: selecting an energy allocation between the propulsion system and the transport refrigeration unit; and determining, based on the selected energy allocation and the energy available in the energy storage device, the vehicle's range and the conditioning time achievable.

According to an tenth aspect, there is provided a method of controlling the energy allocated to a propulsion system and a transport refrigeration unit from an energy storage device of an electric vehicle, the energy storage device having available energy, comprising: receiving a user selection of a desired range of the vehicle; and controlling an energy allocation of the available energy in the energy storage device between the propulsion system and the transport refrigeration unit based on the desired range and the available energy in the energy storage device.

According to an eleventh aspect, there is provided a method of controlling the energy allocated to a propulsion system and a transport refrigeration unit from an energy storage device of an electric vehicle, the energy storage device having available energy, comprising: receiving a user selection of a desired conditioning time of the cargo space of the vehicle; and controlling an energy allocation of the available energy in the energy storage device between the propulsion system and the transport refrigeration unit based on the desired conditioning time and the available energy in the energy storage device.

The method of the ninth to eleventh aspects may comprise one or more features described above in relation to the method of the eighth aspect.

Any of the methods described above may be performed by providing and/or using the energy control system of any of the first to sixth aspects or the electric vehicle system of the seventh aspect. The previously described optional features are applicable, as appropriate, to the energy control systems, electric vehicle system, and the methods described above.

BRIEF DESCRIPTION OF THE DRAWINGS

Preferred embodiments of the present disclosure will now be described in greater detail, by way of example only and with reference to the drawings, in which.

DETAILED DESCRIPTION OF THE INVENTION

Figure 1:
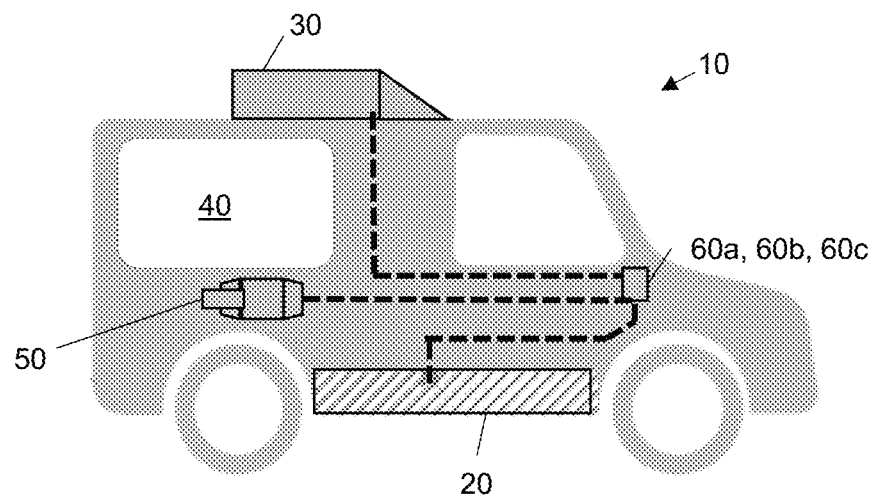
FIG. 1 shows a battery electric vehicle equipped with an energy control system.

FIG. 1 shows a battery electric vehicle 10 in the form of a light commercial vehicle that has an energy storage device 20 in the form of a battery 20, transport refrigeration unit 30, cargo space 40, propulsion system 50 and an energy control system 60a, 60b, 60c.

The battery 20 is configured to power the vehicle 10 and more specifically it is configured to power both the propulsion system 50 and the transport refrigeration unit 30. The battery 20 is rechargeable.

The propulsion system 30 is configured to provide the motive force to drive the vehicle and may be in the form of an electrical motor mechanically coupled to the wheels of the vehicle.

The transport refrigeration unit 30 is configured to condition the atmosphere of the cargo space 40. In other words, the transport refrigeration unit 30 is to maintain the cargo space 40 at a desired temperature suitable for storing cargo such as fresh produce.

The energy control system 60a, 60b, 60c comprises a processor and is in electrical, in this case digital, communication with the battery 20, transport refrigeration unit (TRU) 30 and propulsion system 50. The energy control system 60a, 60b, 60c is configured to receive a user selection relating to energy to be allocated to the propulsion system 50 and/or the transport refrigeration unit 30. The energy control system 60a, 60b, 60c is configured to provide control for an energy allocation of the available energy in the battery 20 between the propulsion system 50 and the TRU 30 based on the user selection and the available energy in the battery 20. In this example a control signal is provided by the energy control system 60a, 60b, 60c to the battery 20 to control how much energy is supplied to each of the propulsion system 50 and TRU.

The energy control system 60a, 60b, 60c comprises a graphical user interface in the form of a touch screen that allows the user to input a user selection. In this example the touch screen is a dedicated touch screen for the energy control system 60a, 60b, 60c, however in other examples the touch screen may be a touch screen shared with the vehicle, e.g. one ordinarily present in the vehicle, such that an additional touch screen is not required. In that case the processor of the energy control system 60a, 60b, 60c can be connected to the touch screen ordinarily present in the vehicle via CAN, OBD, FMS, RS232, or wireless connections.

In one embodiment of the energy control system 60a (described further in relation to FIG. 2), the user selection is of an energy allocation between the vehicle's propulsion system 50 and the transport refrigeration unit 30. In other words, the energy control system 60a, is configured to receive an input regarding the proportion of the available energy in the battery which is to be provided to the propulsion system 50 and the proportion which is to be provided to the transport refrigeration unit 30. The energy control system then provides a control signal to cause the allocated energy to be supplied. For example, the energy control system can provide a control signal to the TRU and propulsion system to indicate the amount of energy that can be received. Once the allocated energy for the propulsion system 50 or the transport refrigeration unit 30 has been spent, the energy control system 60*a* prevents the system/unit that has spent its energy allocation from drawing more energy from the battery 20.

Figure 2:
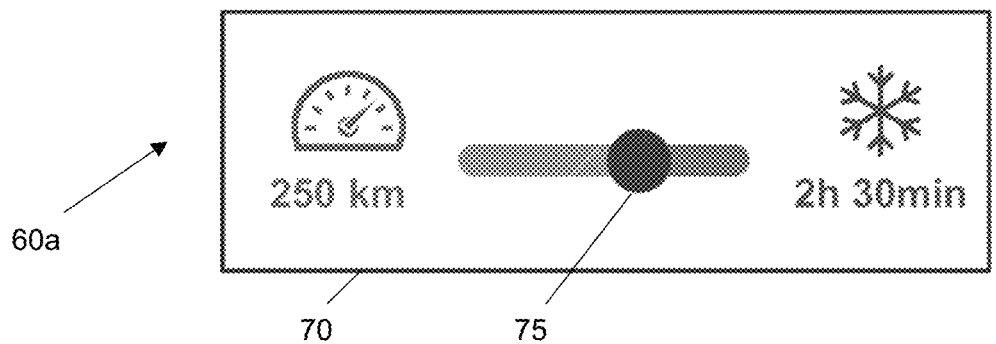
FIG. 2 shows a user interface of an energy control system.

As shown in FIG. 2 the energy control system 60*a* comprises a graphical user interface 70 in the form of a touch screen that allows the user to input an energy allocation for the propulsion system 50 and the transport refrigeration unit 30.

In this example, the user interface 70 is in the form of a slider 75 represented on the touch screen that allows the user to select an energy allocation from 100% being allocated to the propulsion system 50 and 0% to the transport refrigeration unit 30, to 0% being allocated to the propulsion system and 100% to the transport refrigeration unit 30. Once the user has selected an energy allocation via the slider 75, the user interface 70 displays the achievable range of the vehicle 10 and the achievable conditioning time of the cargo space 40 of the vehicle 10 (e.g. the length of time the transport refrigeration unit 30 can operate for) based on the current available energy in the battery 20 and the predicted energy consumption of the propulsion system 50 and transport refrigeration unit 30. The illustrated graphical user interface 70 indicates a selected proportional energy allocation which will provide an estimated range of 250 km and an estimated conditioning time of 2 hours and 30 minutes. By way of further example, if the slider 75 of the user interface 70 was positioned to allocate all the energy available in the battery 20 to the transport refrigeration unit 30, the user interface would update to indicate zero range and the achievable conditioning time of the cargo space 40 of the vehicle 10 (e.g. estimated time for which the transport refrigeration unit 30 can run).

Figure 3:
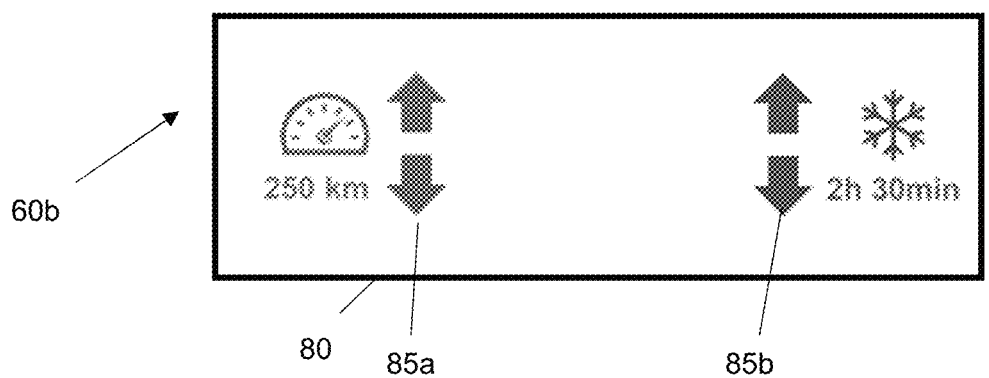
FIG. 3 shows a user interface of another energy control system.

FIG. 3 shows a user interface 80 of an alternative energy control system 60*b* of the battery electric vehicle 10. In this embodiment of the energy control system 60*b*, the user selection is of a desired range of the vehicle 10 or a desired conditioning time of the cargo space 40 of the vehicle 10.

In this embodiment the user can select, via buttons 85*a*, a desired range of the vehicle 10. In this example, when the user inputs a desired range of the vehicle 10 the energy control system 60*b* calculates the energy required to achieve the desired range (a suitable example calculation is given in the summary section). It then determines the conditioning time achievable by subtracting the energy required to achieve the inputted range from the available energy in the battery 20 and comparing that remaining energy to the power consumption of the TRU. This determined conditioning time is then displayed on the user interface 80. Here, the user has selected a range of 250 km and the system has determined and displayed a conditioning time of 2.5 hours.

Alternatively the user may select, via button 85*b*, a desired conditioning time. In this example, when the user inputs a desired conditioning time the energy control system 60*b* calculates the energy required to achieve the desired condition time (a suitable calculation is given in the summary section). It then determines the achievable vehicle range by subtracting the energy required to achieve the inputted conditioning time from the available energy in the energy storage device 20 and comparing that remaining energy to the energy consumption of the propulsion system 50. This determined vehicle range is then displayed on the user interface 80.

Figure 4:
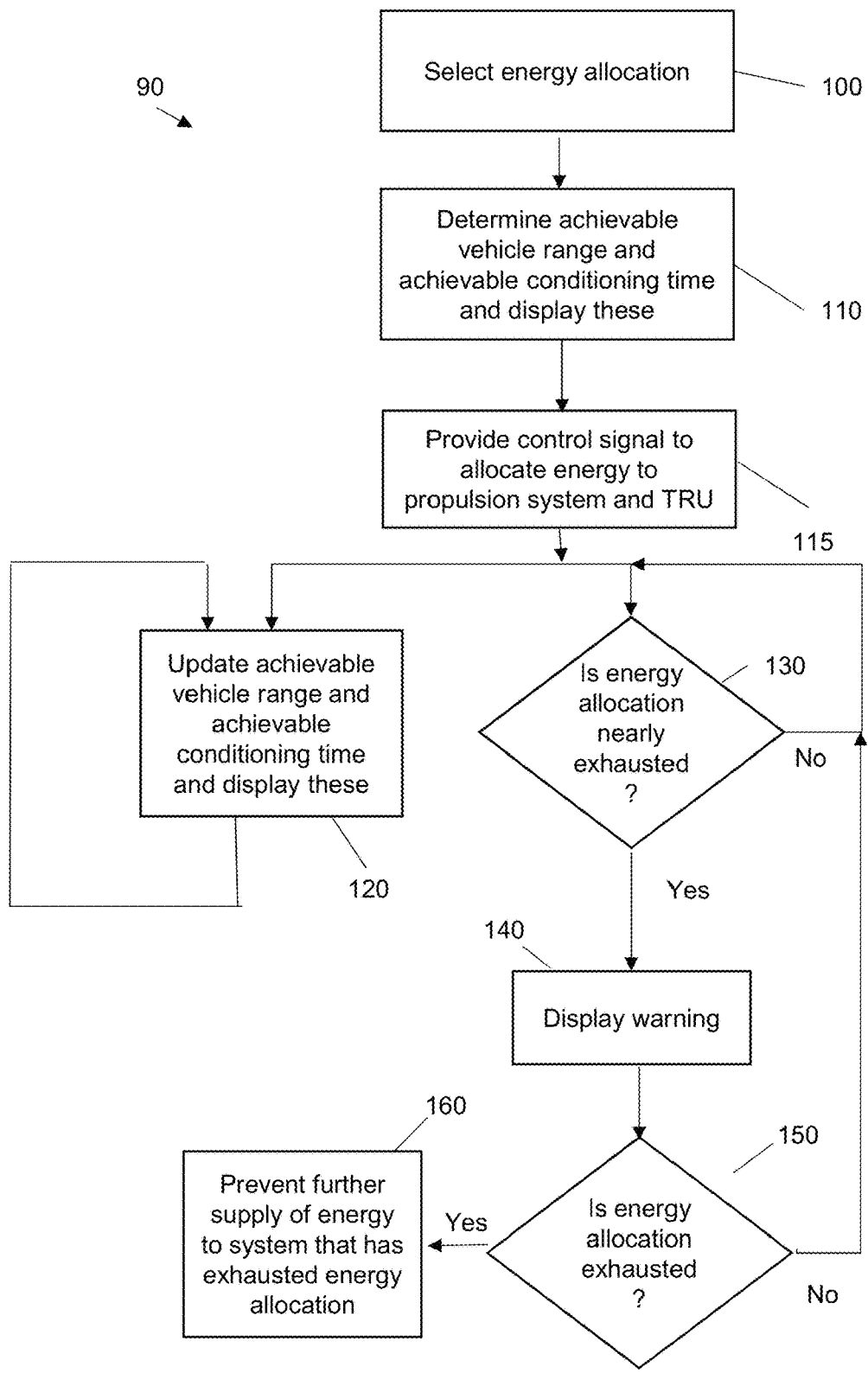
FIG. 4 shows a flow chart representing a method of controlling an energy supply.

FIG. 4 shows a method 90 of controlling the energy allocated to a propulsion system 50 and a transport refrigeration unit 30 from an energy storage device 20 of an electric vehicle 10. The method may for example use an energy control system 60*a* having the graphical user interface 70 of FIG. 2.

At step 100 of the method 90, a user selects an energy allocation between the propulsion system 50 and the transport refrigeration unit 30 of the available energy in the energy storage device 20. At step 110 the achievable vehicle range and the achievable conditioning time of the cargo space (e.g. the time for which the transport refrigeration unit can run) is predicted based on the energy available in the energy storage device, the proportion of available energy allocated to the propulsion system 50 and transport refrigeration unit 30 respectively and the predicted energy consumption/power draw of the propulsion system 50 and transport refrigeration unit 30 respectively. An example equation relating to such a calculation is set out in the summary section. The achievable vehicle range and achievable conditioning time are displayed to the user. The user can therefore adjust the allocation as desired (by selecting energy allocations) to manipulate the achievable range and time, in which case, steps 100, 110 are repeated.

Prior to step 100, i.e. prior to receiving a user selection, the method 90 may provide no control of the energy allocation between the propulsion system 50 and the transport refrigeration unit 30. Alternatively, prior to receiving a user selection at step 100, the method 90 may proceed on the basis of a default energy allocation such as 70% of available energy in the energy storage device 60*a* being allocated to the propulsion system 50 and the remaining 30% of available energy tin the energy storage device 0 being allocated to the transport refrigeration unit 30. Of course the default energy allocation could be in other proportions that would be appreciated by those skilled in the art.

At step 115 the energy control system 60*a* then controls an energy allocation of the available energy in the energy storage device between the propulsion system 50 and the transport refrigeration unit 30 based on the user selected energy allocation and the available energy in the energy storage device 20. E.g., the energy control system sends a control signal to the propulsion system and TRU setting the energy allocation they can each receive.

At step 120, the achievable range and achievable conditioning time are updated during operation of the vehicle and displayed to the user. That is, whilst the vehicle is used and energy from the energy storage device is spent, the current vehicle range remaining and conditioning time achievable are re-determined based on the energy remaining in the energy allocation for each of the propulsion system and TRU and displayed to the vehicle's user in real time.

Concurrently to step 120, a check is conducted at step 130 as to whether the energy allocated to the propulsion system 50 or transport refrigeration unit 30 is nearly exhausted. In other words, a check is conducted at step 130 to determine if the energy used by the propulsion system 50 or transport refrigeration unit 30 is approaching the total energy allocated for the propulsion system 50 or transport refrigeration unit 30. For example, the energy control system 60*a* may be configured to receive a user input of a range and/or conditioning time remaining at which they wish to receive a warning. The user of the vehicle may have selected that they wish to receive a warning if the remaining range is under 50 kilometres or the remaining conditioning time of the cargo space 40 of the vehicle 10 is less than 30 minutes. If the energy remaining in the energy allocation for the propulsion system 50 or transport refrigeration unit 30 reduces below the amount required to provide a range of 50 km and/or 30 minutes conditioning time (in this example), i.e. the energy is nearly exhausted, the method moves to step 140 and issues a warning. If the energy allocation is not nearly exhausted the method repeats step 130.

Following step 140, a check is conducted at step 150 to determine if the allocated energy for the propulsion system 50 or the transport refrigeration unit 30 has been exhausted or not. That is, the method checks at step 150 whether the allocated energy for one of the propulsion system 50 or transport refrigeration unit 30 has been used up. If the allocated energy has been exhausted for one of the propulsion system 50 or the transport refrigeration unit 30 then the method moves to step 160 in which the method prevents further supply of energy from the energy storage device 20 to whichever of the propulsion system 50 or the transport refrigeration unit 30 has exhausted its allocated energy.

If at step 150 it is determined that neither of the propulsion system 50 nor transport refrigeration unit 30 have exhausted the allocated energy then the method returns to step 130.

At any time during the method 90 the user of the vehicle may adjust the energy allocation, step 100. For example, if the allocated energy to one of the propulsion system 50 and transport refrigeration unit 30 is exhausted the user may wish to reallocate energy such that the system that has exhausted its original energy allocation is not prevented from receiving further energy even though it will reduce the energy available to the other system.

Figure 5:
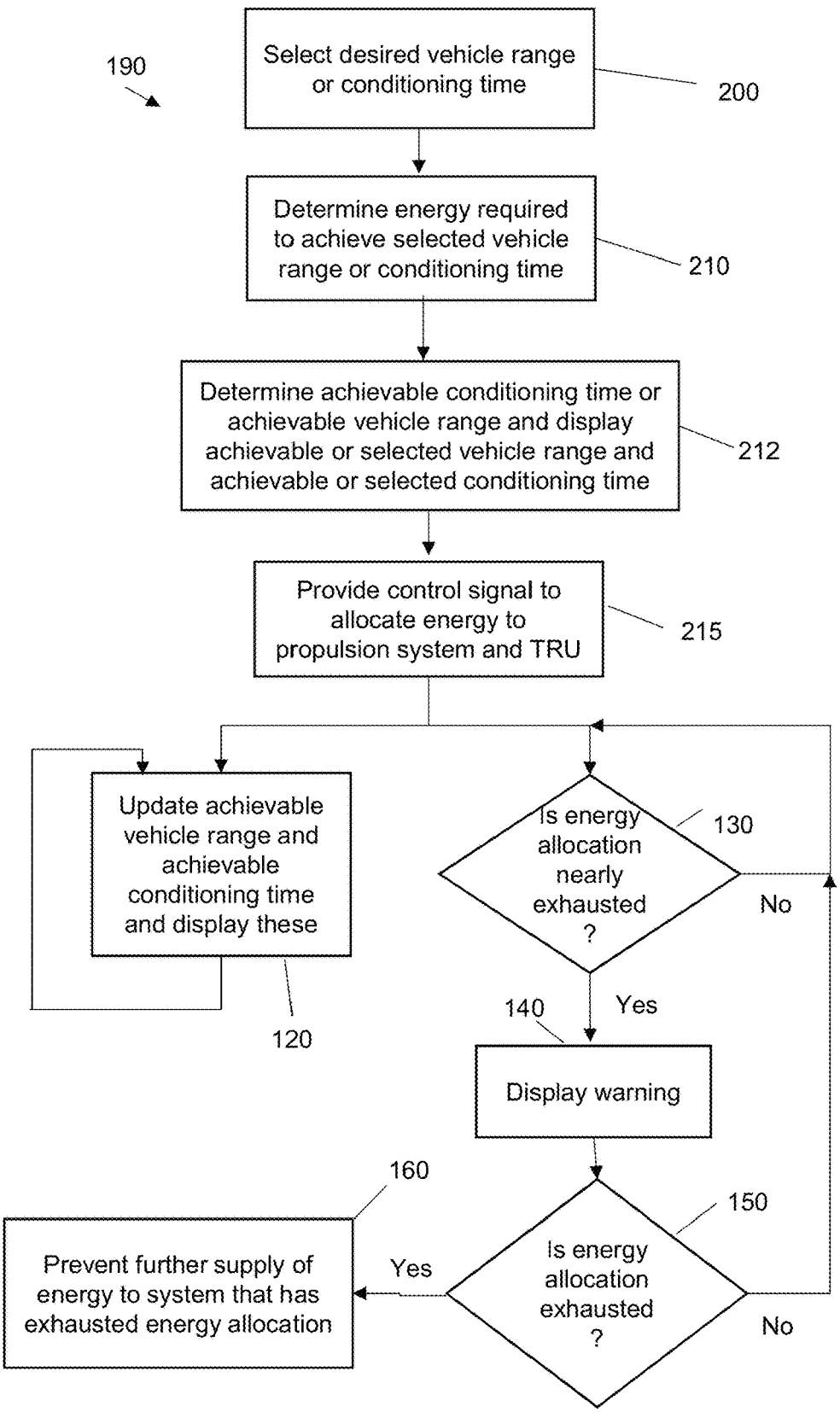
FIG. 5 shows a flow chart representing another method of controlling an energy supply.

FIG. 5 shows another method 190 of controlling the energy allocated to a propulsion system 50 and a transport refrigeration unit 30 from an energy storage device 20 of an electric vehicle 10. The method may for example use an energy control system 60*b* having the graphical user interface 80 shown in FIG. 3.

At step 200 of the method 190, a user selects either a desired vehicle range or a desired conditioning time. Although not shown in the Figure, concurrently at step 200, or indeed prior to step 200, the method may determine the maximum achievable conditioning time (i.e. no energy allocated to the propulsion system) and the maximum achievable vehicle range (i.e. no energy allocated to transport refrigeration system) based on the available energy in the energy storage device 20 and the expected power/energy draw of the respective system. An example equation relating to such a calculation is set out in the summary section. If the user selection at step 200 is greater than the maximum achievable for the respective system the method may display an error message or warning.

Prior to step 200, i.e. prior to receiving a user selection, the method 190 may provide no control of the energy allocation between the propulsion system 50 and the transport refrigeration unit 30.

Alternatively, prior to receiving a user selection at step 200, the method 190 may proceed on the basis of a default energy allocation such as 70% of available energy in the energy storage device 20 being allocated to the propulsion system 50 and the remaining 30% of available energy in the energy storage device 20 being allocated to the transport refrigeration unit 30. Of course the default energy allocation could be in other proportions that would be appreciated by those skilled in the art.

At step 210 the energy required to achieve either the desired vehicle range or the desired conditioning time is calculated based on the expected energy consumption of the propulsion system 50 or the transport refrigeration unit 30 of the vehicle. Example equations relations to such calculations are set out in the summary section.

At step 212 the achievable conditioning time or the achievable vehicle range, whichever the user did not select at step 200, is determined by subtracting the energy required to achieve either the selected vehicle range or the selected conditioning time respectively from the available energy in the energy storage device 20 and comparing that remaining energy to the energy consumption of the propulsion system 50 or transport refrigeration unit 30, i.e. the energy/power consumption of whichever system has not been set a specific target. The achievable or selected vehicle range, and achievable or selected conditioning time (dependent on which is selected by the user) is displayed to the user.

At step 215 the energy control system 60*b* then controls an energy allocation of the available energy in the energy storage device 20 between the propulsion system 50 and the transport refrigeration unit 30 based on the desired range or conditioning time and the available energy in the energy storage device 20. E.g. the energy control system sends a control signal to the propulsion system and TRU setting the energy allocation they can each receive.

In other words, the user selection causes an energy allocation between the propulsion system 50 and the transport refrigeration unit 30. This energy allocation is set based on a desired vehicle range or conditioning time. The energy required to achieve the desired vehicle range or conditioning time is allocated to the propulsion system 50 or transport refrigeration unit 30 respectively and any remaining energy of the available energy in the energy storage device 20 is allocated to the other of the propulsion system 20 or transport refrigeration unit 30.

Following step 215 each of the steps of: updating 120 the achievable range and achievable conditioning time and displaying to the user; checking 130 as to whether the energy allocated to the propulsion system 50 or transport refrigeration unit 30 is nearly exhausted; displaying 140 a warning if nearly exhausted; determining 150 if the allocated energy for the propulsion system 50 or the transport refrigeration unit 30 has been exhausted or not; and preventing 160 further supply of energy from the energy storage device 20 to whichever of the propulsion system 50 or the transport refrigeration unit 30 has exhausted its allocated energy previously described in relation to FIG. 4 are repeated.

At any time during the method 190 the user may select a new desired vehicle range or conditioning time, step 200. For example, if the allocated energy to one of the propulsion system 50 and transport refrigeration unit 30 is exhausted the user may wish to reallocate energy such that the system that has exhausted its original energy allocation is not prevented from receiving further power even though it will reduce the energy available to the other system.

Whilst the energy control systems 60*a*, 60*b* having the user interfaces 70, 80 of FIGS. 2 and 3 have been described separately, and similarly the methods 90, 190 of FIGS. 4 and 5 have been described separately, it will be understood that the energy control systems 60*a*, 60*b*, interfaces 70, 80 and methods 90, 190 may be combined. For example, an energy control system 60*c* may be configured to receive a user selection of a desired energy allocation, desired range, or desired conditioning time. In other words, the system can receive a user input of any one of those and provide control based on the received value. In this case the user may be provided with the option on a user interface of which method to use, which might include displaying the relevant user interface. Alternatively, and as a further example, both the user interfaces of FIGS. 2 and 3 could be presented to the user and the interface interacted with by the user may trigger the corresponding method of FIG. 4 or 5.

In the illustrated example methods the energy allocation is set when the user makes their selection and is not updated during operation of the vehicle (unless of course the user makes as new selection). However in other non-illustrated example methods, the energy allocation is updated in real-time e.g. as set out in the summary section and a control signal to update the allocated energy is provided accordingly.

What is claimed is:

1. An energy control system for use with an electric vehicle having an energy storage device that powers both a propulsion system of the vehicle and a transport refrigeration unit that is configured to condition a cargo space of the vehicle,
   wherein the energy control system is configured to receive a user selection relating to energy to be allocated to the propulsion system and/or the transport refrigeration unit;
   wherein the energy control system is configured to provide control for an energy allocation of the available energy in the energy storage device between the propulsion system and the transport refrigeration unit based on the user selection and the available energy in the energy storage device; and
   wherein the user selection comprises a selected energy allocation between the propulsion system and the transport refrigeration unit.

2. An energy control system according to claim 1, wherein the energy control system is configured to determine an achievable range of the vehicle and an achievable conditioning time of the cargo space of the vehicle based on the selected energy allocation and the available energy in the energy storage device.

3. The energy control system according to claim 2, wherein the energy control system is configured to receive a user selection of a target temperature of the cargo space and wherein the energy control system is configured to provide control for the energy allocation and/or determine the achievable conditioning time also based on the target temperature.

4. An energy control system according to claim 2, wherein the energy control system comprises a display to display the achievable range and the achievable conditioning time to the user.

5. The energy control system according to claim 1, wherein the energy control system is configured to monitor the energy used by the propulsion system and/or the transport refrigeration unit and provide a warning that the energy used by the propulsion system and/or the transport refrigeration unit is within a predetermined threshold of the allocated energy for the propulsion system or transport refrigeration unit respectively;
   and/or wherein the energy control system is configured to monitor the energy used by the propulsion system and/or the transport refrigeration unit and prevent further energy from being supplied to the propulsion system or transport refrigeration unit if the allocated energy has been used up by the propulsion system or transport refrigeration unit respectively.

6. An electric vehicle system comprising:
   the energy control system of claim 1; and
   an electric vehicle comprising:
   a transport refrigeration unit configured to condition a cargo space of the vehicle;
   a propulsion system configured to propel the vehicle; and
   an energy storage device configured to power both the transport refrigeration unit and the propulsion system.

7. The electric vehicle system of claim 6,
   wherein the electric vehicle is an electric light commercial vehicle, an electric heavy goods vehicle or an electric truck;
   and/or
   wherein the electric vehicle comprises the energy control system;
   or wherein the energy control system is comprised in a separate device to the electric vehicle;
   or wherein the energy control system comprises multiple components comprised in at least the electric vehicle and a separate device.

8. An energy control system for use with an electric vehicle having an energy storage device that powers both a propulsion system of the vehicle and a transport refrigeration unit that is configured to condition a cargo space of the vehicle,
   wherein the energy control system is configured to receive a user selection relating to energy to be allocated to the propulsion system and/or the transport refrigeration unit;
   wherein the energy control system is configured to provide control for an energy allocation of the available energy in the energy storage device between the propulsion system and the transport refrigeration unit based on the user selection and the available energy in the energy storage device; and
   wherein the user selection comprises a desired conditioning time of the cargo space of the vehicle, and wherein the energy control system is configured to provide control to allocate energy to the transport refrigeration unit to achieve the desired conditioning time and to allocate the remaining energy from the available energy in the energy storage device to the propulsion system.

9. An energy control system according to claim 8, wherein the energy control system is configured to determine an achievable range of the vehicle based on the remaining energy.

10. An energy control system according to claim 9, wherein the energy control system comprises a display to display the achievable range to the user.

11. The energy control system according to claim 8, wherein the energy control system is configured to monitor the energy used by the propulsion system and/or the transport refrigeration unit and provide a warning that the energy used by the propulsion system and/or the transport refrigeration unit is within a predetermined threshold of the allocated energy for the propulsion system or transport refrigeration unit respectively;
   and/or wherein the energy control system is configured to monitor the energy used by the propulsion system and/or the transport refrigeration unit and prevent further energy from being supplied to the propulsion system or transport refrigeration unit if the allocated energy has been used up by the propulsion system or transport refrigeration unit respectively.

12. An electric vehicle system comprising:
   the energy control system of claim 8; and
   an electric vehicle comprising:
   a transport refrigeration unit configured to condition a cargo space of the vehicle;
   a propulsion system configured to propel the vehicle; and
   an energy storage device configured to power both the transport refrigeration unit and the propulsion system.

13. The electric vehicle system of claim 12,
wherein the electric vehicle is an electric light commercial vehicle, an electric heavy goods vehicle or an electric truck;
and/or
wherein the electric vehicle comprises the energy control system;
or wherein the energy control system is comprised in a separate device to the electric vehicle;
or wherein the energy control system comprises multiple components comprised in at least the electric vehicle and a separate device.

14. A method of controlling energy allocated to a propulsion system and a transport refrigeration unit from an energy storage device of an electric vehicle, the energy storage device having available energy, comprising:
receiving a user selection relating to energy to be allocated to the propulsion system and/or the transport refrigeration unit;
controlling an energy allocation of the available energy in the energy storage device between the propulsion system and the transport refrigeration unit based on the user selection and the available energy in the energy storage device; and
wherein the user selection comprises a selected energy allocation between the propulsion system and the transport refrigeration unit.

15. The method of claim 14, further comprising determining an achievable range of the vehicle and an achievable conditioning time of the cargo space of the vehicle based on the selected energy allocation and the available energy in the energy storage device.

16. The method of claim 15, further comprising displaying the achievable range and the achievable conditioning time.

17. The method of claim 14, wherein the electric vehicle is an electric light commercial vehicle, an electric heavy goods vehicle or an electric truck.

18. A method of controlling energy allocated to a propulsion system and a transport refrigeration unit from an energy storage device of an electric vehicle, the energy storage device having available energy, comprising:
receiving a user selection relating to energy to be allocated to the propulsion system and/or the transport refrigeration unit;
controlling an energy allocation of the available energy in the energy storage device between the propulsion system and the transport refrigeration unit based on the user selection and the available energy in the energy storage device; and
wherein the user selection comprises a desired conditioning time of the cargo space of the vehicle, the method comprising allocating energy to the transport refrigeration unit to achieve the desired conditioning time and allocating the remaining energy from the available energy to the propulsion system.

19. The method of claim 18, further comprising determining an achievable range of the vehicle based on the remaining energy.

20. The method of claim 19, further comprising displaying the achievable range and the desired conditioning time and/or wherein the electric vehicle is an electric light commercial vehicle, an electric heavy goods vehicle or an electric truck.

* * * * *